W. ESTY.

Assignor to C. A., J. T. & F. E. Busiel.

ART OF KNITTING STOCKINGS.

No. 11,221. Reissued Feb. 2, 1892.

Witnesses,
R. E. Grant
G. E. Tucker

Inventor,
William Esty,
by his attorney
J. S. Brown.

UNITED STATES PATENT OFFICE.

WILLIAM ESTY, OF LACONIA, NEW HAMPSHIRE, ASSIGNOR TO CHARLES A. BUSIEL, JOHN T. BUSIEL, AND FRANK E. BUSIEL, OF SAME PLACE.

ART OF KNITTING STOCKINGS.

SPECIFICATION forming part of Reissued Letters Patent No. 11,221, dated February 2, 1892.

Original No. 247,326, dated September 20, 1881. Application for reissue filed December 22, 1884. Serial No. 151,012.

*To all whom it may concern:*

Be it known that I, WILLIAM ESTY, of Laconia, in the county of Belknap and State of New Hampshire, have invented an Improvement in the Art of Knitting Stockings; and I do hereby declare the following to be a full, clear, and exact description of the invention, such as will enable others skilled in the art to which it pertains to make and use it, reference being had to the accompanying drawings, which form part of this specification.

My invention relates to the art of manufacturing stockings; and it consists in knitting the leg of the stocking down to the point where the foot commences, knitting the foot and heel portions as a flat web with selvage edges and with suitable bulged projections for the heel and toe, and then connecting the end or ends of such foot and heel portions to the leg portion and joining the selvage edges of the said foot portion by seaming, as will be more fully described hereinafter.

One object of this invention is to knit the foot portions of stockings in a continuous flat web, which is afterward cut into suitable lengths and then united to the leg portions, which have been separately knit, and thus formed into stockings.

Figure 1:
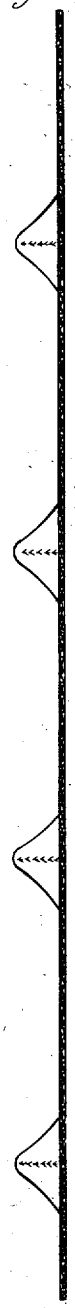
Figure 2:
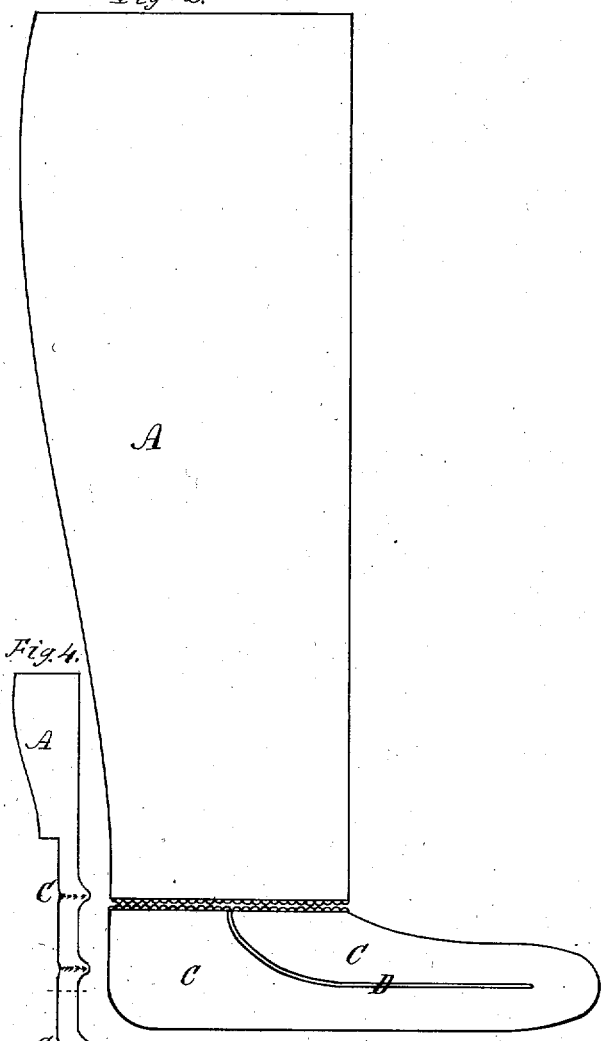
Figure 3:
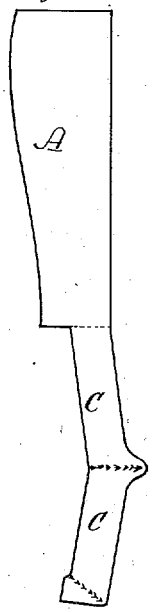
Figure 4:
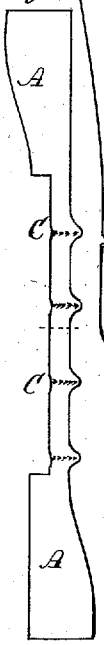

Figure 1 is an edge view of a length of webbing knit in one continuous length, and out of which the foot portions of the stockings are formed. Fig. 2 is a side elevation of a leg and foot portion just ready to be joined together. Fig. 3 is a side elevation of a leg having a foot portion united at one end to it. Fig. 4 is a similar view of two legs and two feet united together in one continuous length.

A represents the leg of the stocking, which is knit upon a circular machine in the usual manner. The foot portion C of the stocking is knit upon a straight machine, in one continuous flat web of any desired length, in which web are formed at regular intervals apart bulged projections or pockets for the heels and toes. This web is cut into suitable lengths, so as to form the foot portions of the stockings, and each length is then doubled upon itself, as shown in Fig. 2, and then has each of its ends united to the bottom edges of the leg in any suitable manner, so as to form a complete stocking. After the ends of the foot portion have been united to the leg portion the selvage edges D of the foot are seamed or united together in any suitable manner, and the stocking is complete.

Instead of knitting the foot portions in one long continuous web and then cutting it into lengths, as above described, a portion of the stitches on the lower edge of the leg may be run upon the needles of a footer and the foot be begun and knit from this point, as shown in Fig. 3. This knitting may be begun at the top part of the foot and end at the heel, or may be begun at the heel and end at the top part of the foot, as may be preferred.

When the foot portion is to be knit onto the leg, in order to save one taking the work off of the machine two foot portions may be knit in one length, and then the last end of the second foot be knit or otherwise joined to a second leg, as shown in Fig. 4. The two foot portions are then separated at the dotted line, and each stocking is then finished separately.

Having thus described my invention, I claim—

1. The improvement in the art of knitting stockings which consists in knitting the leg of the stocking down to the point where the foot is to commence in the usual manner, knitting the foot portion as a flat web with selvage edges and with suitable bulged projections for the toe and heel, then uniting the end or ends of such foot portion to the leg portion, and finally joining the selvage edges of the said foot portion by seaming, substantially as described.

2. The improvement in the art of knitting stockings which consists, first, in knitting the leg of the stocking down to the point where the foot is to commence in the usual manner; second, knitting the foot portion as a flat web with selvage edges and with suitable bulged projections for the toe and heel, and, finally, uniting the ends of such foot portion to the leg portion and joining the selvage edges of the said foot portion by seaming, substantially as described.

WILLIAM ESTY.

Witnesses:

STEPHEN S. JEWETT,

GEORGE A. MALLISON.